(No Model.)
A. FISHER & G. H. PRESTLEY.
HORSE HITCHING DEVICE.
No. 490,874. Patented Jan. 31, 1893.
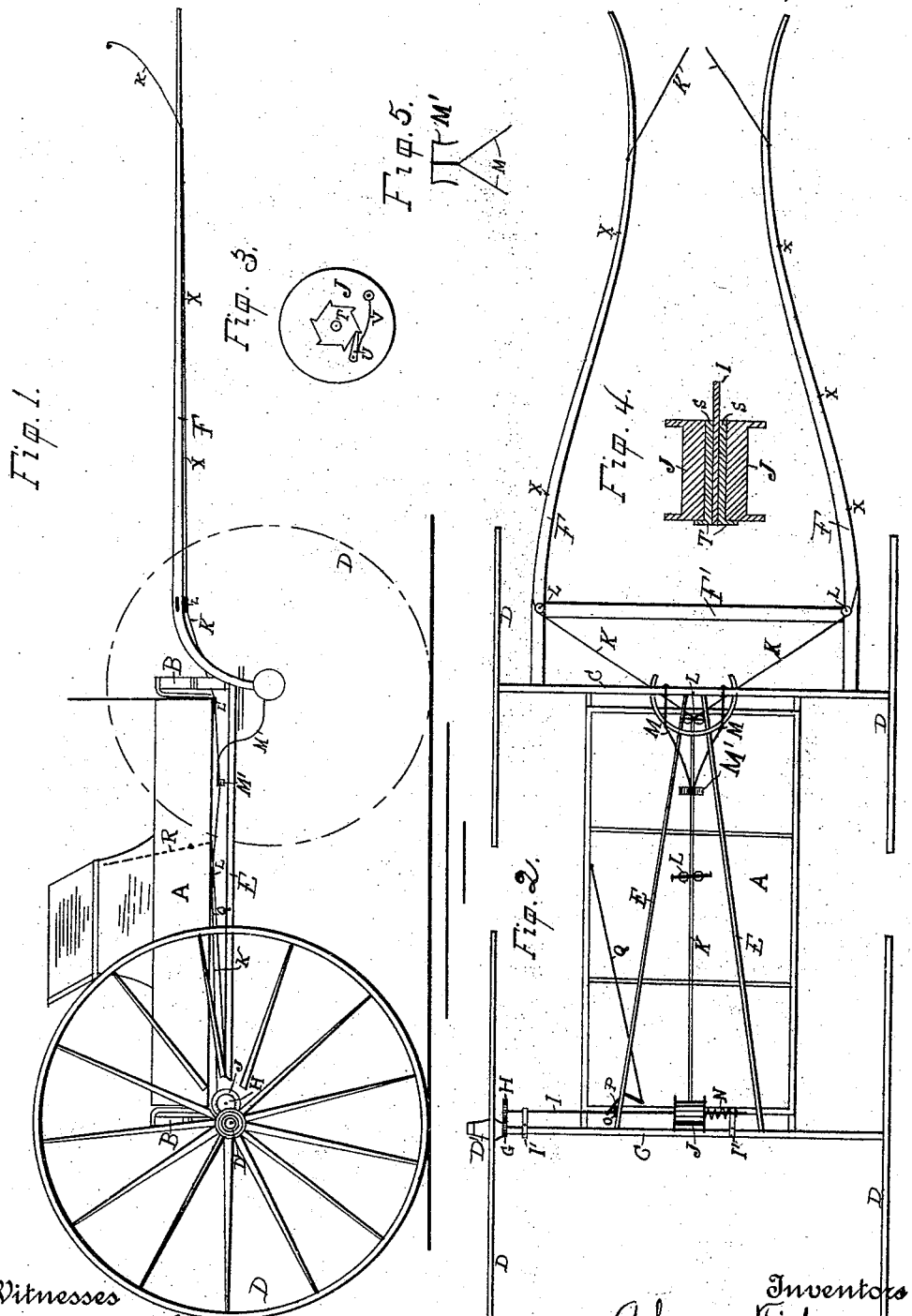
Witnesses
Wolbry Haynes
Lillie Hodge
Inventors
Alonzo Fisher and
George H. Prestley
By Joshua B. Webster Attorney

UNITED STATES PATENT OFFICE.

ALONZO FISHER AND GORGE H. PRESTLEY, OF STOCKTON, CALIFORNIA; SAID FISHER ASSIGNOR OF ONE-SIXTH TO SAID PRESTLEY.

HORSE-HITCHING DEVICE.

SPECIFICATION forming part of Letters Patent No. 490,874, dated January 31, 1893.

Application filed October 10, 1892. Serial No. 448,401. (No model.)

*To all whom it may concern:*

Be it known that we, ALONZO FISHER and GORGE H. PRESTLEY, citizens of the United States, residing at Stockton, in the county of San Joaquin and State of California, have invented certain new and useful Improvements in Safety Attachments for Vehicles; and we do declare the following to be a full, clear, and exact description of the invention, such as will enable others skilled in the art to which it appertains to make and use the same, reference being had to the accompanying drawings, and to the letters of reference marked thereon, which form a part of this specification.

Our invention is an improved safety attachment for vehicles, adapted to prevent the animal drawing the vehicle, from running away; and it consists in the peculiar construction, novel combination and adaptation of parts hereinafter described and particularly pointed out in the claim appended.

In the accompanying drawings, Figure 1 is a right hand side elevation of a vehicle to which is attached our improved safety device. Fig. 2 is a plan view of the bottom of the same. Fig. 3 is a detached end view of the spool attachment. Fig. 4 is a sectional view of the same at right angles to Fig. 3. Fig. 5 is a detached back view of a double guide M'.

A represents the body of the vehicle. B the springs, C, the axles and D the wheels.

E are the reaches, F, the shafts and F' the cross bar.

G is a gear wheel attached by screws to the inner end of the hub D' of one of the hind wheels and intermeshing with a gear wheel H keyed onto the end of a shaft, I, which is parallel with the hind axle C and is attached to the front ends of plates I' which, at their rear ends are attached to the axle.

Near the center of and beneath the body A, a spool J is loosely inserted upon the shaft I, as will be shown. We will also explain the functions of the spool J hereinafter.

K are strong cords attached to the face of the spool J and extend forwardly through a series of pulleys L located as follows: two beneath the body A near its center, two near the front of the same, and one each on the shafts at the ends of the cross bar F', from which they extend along the shafts through screw-eyes X to the horse's bits.

M are legs attached at their feet to the front axle and extending rearwardly support a double headed guide M' upon the side of which the respective parts of the cords K impinge.

The spool J turns rearwardly on the shaft I, as will be shown, and engages at one side with a spiral spring N on the shaft I, such spring N being retained in position by the spool J and one of the bars I'. The spool J contains a box or core S keyed upon the shaft I. Upon the end of the core S is attached a ratchet T, having its spring pawl U V attached to the face of the ends of the spool permitting the spool to revolve backward upon the core S, but rigidly engaging with and being turned with the shaft when a forward movement is acquired, as will be shown. The spring N holds the gear wheel H in mesh with the gear wheel G. In order to throw the same out of gear, there is a collar O rigidly attached to the shaft I. An angle arm P is attached at its elbow to and near the rear end of the reach E and has, extending forwardly from its inner end, a brake-rod Q, which is attached at its forward end to a lever R in the inside of the bed, which lever R is attached at its foot to the bed. The rear of the arm P comes in contact with the collar O when throwing the shaft I out of gear. While driving, the shaft I and gear wheel H are thrown out of gear. If there is a run away, also when the animal is left standing, they are put in gear, thus causing the spool J to revolve rearwardly and pulling on the bits of the horse by means of the connecting lines K, which are being wound upon the spool. The double headed guide M', which is attached to the front axle in the manner set forth, serves, when the horse turns to the left to draw upon the right rein and pull the horse's head toward the right, and the said guide also serves, when the horse turns to the right to draw upon the left rein and pull the horse's head toward the left. Thus it will be seen that the horse will be kept in a straight course and damage to the vehicle will be averted. The use of the core S on the shaft I permits of an easier movement of the spool J thereon with less friction than if immediately turning on the shaft I.

Having thus described our invention, what we claim as new and desire to secure by Letters Patent, is

A safety attachment to vehicles consisting of the gear wheel G attached to the inner end of one of the hubs D', a gear wheel H intermeshing with the gear wheel G, and attached to the end of the shaft I, the spool J having a core or hub S, the shaft I inserted in and keyed to such core, the ratchet T, on the end of the core S, its spring pawl, U V, on the end of the spool J, the plates I' attached to the rear axle C and to the shaft I, the spiral spring N between one of the plates I' and the spool J, the cords K attached to the spool J and extending forwardly through pulleys L and double guide head M' attached beneath the body A, and eyes X attached to the shafts, and the device for throwing in and out of gear consisting of the collar O on the shaft I, the angle arm P, the rod Q and the lever R, all operating substantially as shown and described.

In testimony whereof we affix our signatures in presence of two witnesses.

ALONZO FISHER.
GORGE H. PRESTLEY.

Witnesses:
JOSHUA B. WEBSTER,
JAMES T. SUMMERVILLE.